United States Patent
Yoo et al.

(10) Patent No.: US 12,491,889 B2
(45) Date of Patent: Dec. 9, 2025

(54) METHOD AND APPARATUS FOR TRACKING ROAD FACILITY BASED ON VEHICLE MOTION CHARACTERISTICS

(71) Applicant: HYUNDAI MOBIS Co., Ltd., Seoul (KR)

(72) Inventors: Kyung Woo Yoo, Seoul (KR); Dong Hee Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 434 days.

(21) Appl. No.: 17/682,097

(22) Filed: Feb. 28, 2022

(65) Prior Publication Data
US 2023/0166736 A1   Jun. 1, 2023

(30) Foreign Application Priority Data

Nov. 26, 2021   (KR) .................. 10-2021-0165621

(51) Int. Cl.
  *B60W 40/06*   (2012.01)
  *B60W 40/10*   (2012.01)
  *G01S 13/89*   (2006.01)

(52) U.S. Cl.
  CPC ............ *B60W 40/06* (2013.01); *B60W 40/10* (2013.01); *G01S 13/89* (2013.01); *B60W 2420/408* (2024.01); *B60W 2552/53* (2020.02)

(58) Field of Classification Search
  CPC ................. B60W 40/06; B60W 40/10; B60W 2420/408; B60W 2552/53; B60W 40/02;
  (Continued)

(56) References Cited

U.S. PATENT DOCUMENTS

2007/0010937 A1   1/2007   Sakuma
2012/0271483 A1   10/2012   Samukawa et al.
(Continued)

FOREIGN PATENT DOCUMENTS

JP   2007017338 A  *  1/2007   ............. G01C 21/32
JP   2012-240480 A   12/2012
(Continued)

OTHER PUBLICATIONS

Adam et al., Probabilistic Road Estimation and Lane Association Using Radar Detections, Professorship of Communications Engineering Chemnitz University of Technology Chemnitz, Germany, 2011 (Year: 2011).*

(Continued)

*Primary Examiner* — Scott A Reinbold
(74) *Attorney, Agent, or Firm* — Morgan, Lewis & Bockius LLP

(57) ABSTRACT

The present disclosure in some embodiments provides a method and an apparatus for tracking a road facility based on vehicle motion characteristics. In at one aspect, the present disclosure provides an apparatus for tracking a road facility, including a coordinate generation unit configured to generate initial coordinates based on a location of a vehicle and a plurality of detection information items collected by a radar included in the vehicle, the initial coordinates being generated for updating tracking coordinates of the road facility, and a coordinate update unit configured to update, based on motion characteristics of the vehicle, the tracking coordinates of the road facility in response to vehicle coordinates that change over time.

14 Claims, 12 Drawing Sheets

(58) Field of Classification Search
CPC .......... G01S 13/89; G01S 13/72; G01S 13/08; G01S 13/66; G01S 7/412; G01S 13/60
USPC .......................................................... 701/1
See application file for complete search history.

(56) References Cited

U.S. PATENT DOCUMENTS

| | | | |
|---|---|---|---|
| 2018/0120416 | A1 | 5/2018 | Kitamura |
| 2020/0307560 | A1* | 10/2020 | Shin ...................... G01S 13/931 |
| 2021/0190512 | A1* | 6/2021 | Choi ...................... G06V 20/56 |

FOREIGN PATENT DOCUMENTS

| | | |
|---|---|---|
| KR | 10-2015-0061950 A | 6/2015 |
| WO | 2016/136857 A1 | 9/2016 |
| WO | 2020/199010 A1 | 10/2020 |

OTHER PUBLICATIONS

Adam et al., Probabilistic Road Estimation and Lane Association Using Radar Detections, Professorship of Communications Engineering Chemnitz University of Technology Chemnitz, Germany, 2011.

Lundquist et al., Tracking Stationary Extended Objects for Road Mapping using Radar Measurements, Division of Automatic Control Linkoping University SE-581 83 Linkoping, Sweden, 2009.

Park et al., Lane Estimation Using Lateral Histogram in Radar Based ACC System, DAS Design Center, Global R&D, Mando, Seong-nam Si, Korea, 2014.

Extended European Search Report dated Sep. 13, 2022, issued in correspondingEuropean Patent Application No. 22164310.9.

Office Action issued on Dec. 27, 2023 in Korean Patent Application No. 10-2021-0165621 with English translation.

Extended European Search Report issued on Feb. 16, 2024 in European Patent Application No. 22164310.9.

D. Xie et al., "Obstacle detection and tracking method for autonomous vehicle based on three-dimensional LiDAR. International Journal of Advanced Robotic Systems. 2019".

Office Action issued on Aug. 21, 2024 in Korean Patent Application No. 10-2021-0165621 with English translation.

Office Action issued on Apr. 25, 2025 in Chinese Patent Application No. 202210367823.2 with English translation (Note: US US2020307560A1 and NPL: "Probabilistic Road Estimation and . . ."by Adam, Christian, et al cited in this CN Office Action have already been cited in a prior IDS.).

* cited by examiner

METHOD AND APPARATUS FOR TRACKING ROAD FACILITY BASED ON VEHICLE MOTION CHARACTERISTICS

CROSS-REFERENCE TO RELATED APPLICATIONS

This application is based on, and claims priority from, Korean Patent Application Number 10-2021-016562, filed Nov. 26, 2021, the disclosure of which is incorporated by reference herein in its entirety.

TECHNICAL FIELD

The present disclosure in some embodiments relates to a method and an apparatus for tracking a road facility based on vehicle motion characteristics.

BACKGROUND

The statements in this section merely provide background information related to the present disclosure and do not necessarily constitute prior art.

RADAR, i.e., Radio Detection And Ranging is a detection apparatus that uses a transmission antenna to radiate a radio wave and uses a receiver antenna to receive a signal reflected by an object. The radar detects information about an object by using a time difference between a transmitted signal and a received signal and a Doppler shift of the received signal with respect to the transmitted signal. For example, the information on the object includes a relative distance between a signal source and the object, a relative speed of the object with respect to the signal source, and an angle of the object with respect to the moving direction of the signal source.

An automotive radar disposed in a vehicle detects road facilities located around the ego vehicle in addition to the surrounding vehicle. In general, a software application incorporating a vehicle radar estimates the distance between the ego vehicle and a moving neighboring vehicle and the relative speed of the neighboring vehicle using tracking information about the surrounding vehicle. The software application can improve the tracking performance against the surrounding vehicle by using the tracking information for continuous structures. For example, the continuous structures include guardrails and tunnels. However, with a continuous structure positioned parallel to the moving direction of the ego vehicle, the relative distance of the structure to the ego vehicle is in an inverse proportion to the reflected signal intensity. The decreasing intensity of the received signal reflected from the structure decreases deteriorates the detection performance of the structure. The result is deterioration in tracking accuracy and degraded tracking performance on the road facility.

SUMMARY

According to at least one embodiment, the present disclosure provides an apparatus for tracking a road facility, including a coordinate generation unit and a coordinate update unit. The coordinate generation unit is configured to generate initial coordinates based on a location of a vehicle and a plurality of detection information items collected by a radar included in the vehicle, the initial coordinates being generated for updating tracking coordinates of the road facility. The coordinate update unit is configured to update, based on motion characteristics of the vehicle, the tracking coordinates of the road facility in response to vehicle coordinates that change over time.

According to another embodiment, the present disclosure provides a method performed by an apparatus for tracking a road facility, including generating initial coordinates based on a location of a vehicle and a plurality of detection information collected by a radar included in the vehicle, the initial coordinates being generated for updating tracking coordinates of the road facility, and updating, based on motion characteristics of the vehicle, the tracking coordinates of the road facility in response to vehicle coordinates that change over time.

According to yet another embodiment, the present disclosure provides a vehicle including the apparatus for tracking a road facility.

BRIEF DESCRIPTION OF THE DRAWINGS

FIG. 6A illustrates a prior art method of tracking a target vehicle, whereas

REFERENCE NUMERALS

Figure 1:
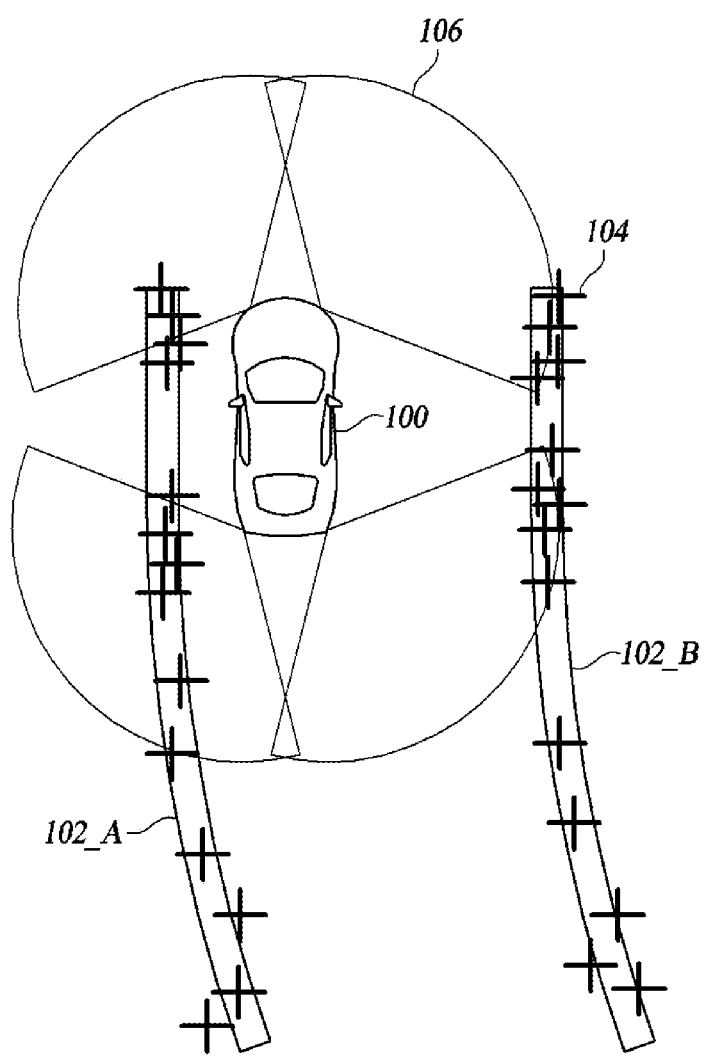
FIG. 1 is a conceptual diagram for explaining the operation of a road facility tracking apparatus according to at least one embodiment of the present disclosure.

| | |
|---|---|
| 100: vehicle | 102: guardrail |
| 104: detection information | 106: viewing angle |
| 200: road facility tracking apparatus | 300: detection area |
| 302: stationary detection information | |

DETAILED DESCRIPTION

The present disclosure in some embodiments seeks to provide a road facility tracking method and an apparatus therefor with a guardrail tracking function based on a guardrail initialization and a dynamic model.

The present disclosure in some embodiments seeks to provide a road facility tracking method and an apparatus therefor which can delete ghost tracking based on detection information of a guardrail.

In some embodiments, the present disclosure seeks to provide a road facility tracking method and an apparatus therefor with a function of detecting deterioration of tracking performance based on detection information of a guardrail.

The issues to be solved by the present disclosure are not limited to those mentioned above, and other unmentioned issues will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The present disclosure provides a method of tracking road facilities based on motion characteristics of a vehicle and an apparatus therefor. For example, a road facility tracking apparatus according to at least one embodiment of the present disclosure can remove a ghost target generated due to velocity ambiguity or detection performance degradation. Accordingly, the road facility tracking apparatus can provide an improved detection performance on the road facility located around the vehicle.

In the present disclosure, a software application refers to Advanced Driver Assistance Systems (ADAS) such as a rear-lateral collision warning (Blind-Spot Collision Warning, hereinafter 'BCW') or a rear cross-traffic collision warning (hereinafter 'RCCW').

In the present disclosure, a road facility means a facility disposed on a road in a direction parallel to the driving direction of the vehicle, such as a guardrail or a tunnel wall.

The detailed description set forth below in conjunction with the appended drawings is intended to describe exemplary embodiments of the present disclosure and is not intended to represent the only embodiments in which the present disclosure may be practiced.

FIG. 1 is a conceptual diagram for explaining the operation of a road facility tracking apparatus according to at least one embodiment of the present disclosure.

The road facility tracking apparatus according to at least one embodiment is disposed in a vehicle 100, for tracking a road facility by using a radio signal reflected from an external object. For example, the road facility tracking apparatus tracks the position of a guardrail 102 based on detection information 104 existing within a field of view (FOV). The instant embodiment assumes that the road facility is the guardrail 102 or tunnel walls, for describing the operation of the road facility tracking apparatus. However, specific types of road facilities are not limited to the illustrated embodiments of the present disclosure. The road facility tracking apparatus tracks the changing relative distance between the vehicle 100 and the guardrail 102 due to the movement of the vehicle 100.

Figure 2:
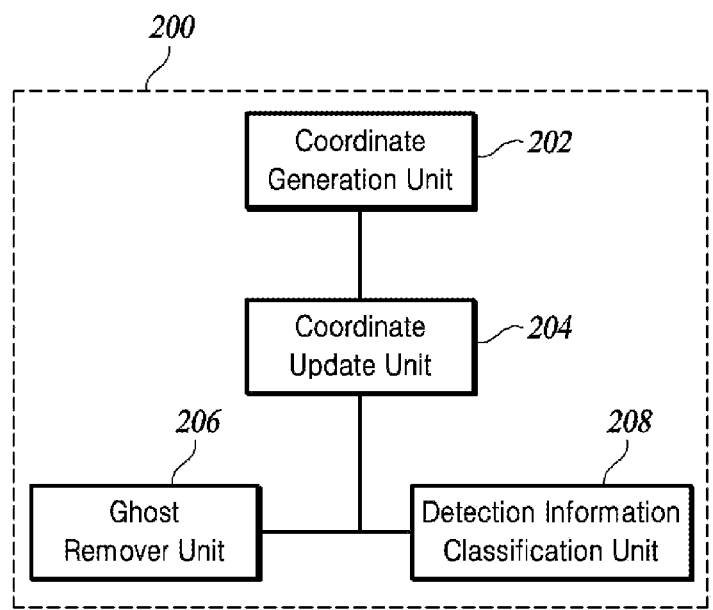
FIG. 2 is a block diagram of a road facility tracking apparatus according to at least one embodiment of the present disclosure.

FIG. 2 is a block diagram of a road facility tracking apparatus 200 according to at least one embodiment of the present disclosure.

The road facility tracking apparatus 200 according to at least one embodiment includes a processor (e.g., computer, microprocessor, CPU, ASIC, circuitry, logic circuits, etc.) and an associated non-transitory memory storing software instructions which, when executed by the processor, provides the functionalities of a coordinate generation unit 202, a coordinate update unit 204, a ghost remover unit 206, and a detection information classification unit 208 in whole or in part. The road facility tracking apparatus 200 shown in FIG. 2 is according to at least one embodiment of the present disclosure, and not all blocks shown in FIG. 2 are requisite components, and some blocks included in the road facility tracking apparatus 200 may be added, changed, or deleted in another embodiment. The respective components included in the road facility tracking apparatus 200 may be logical components for the operation of control logic. Herein, the memory and the processor may be implemented as separate semiconductor circuits. Alternatively, the memory and the processor may be implemented as a single integrated semiconductor circuit. The processor may embody one or more processor(s).

The following describes the respective components included in the road facility tracking apparatus 200 by referring to FIG. 2.

The coordinate generation unit 202 generates initial coordinates for updating tracking coordinates of road facilities based on the location of the vehicle 100 and a plurality of detection information items 104 collected by a radar included in the vehicle 100. For example, the coordinate generating unit 202 generates, as initial coordinates, detection information corresponding to an object closest from the radar in a broadside direction. The broadside direction refers to a direction perpendicular to the driving direction of the vehicle 100.

When detecting an object with a higher signal-to-noise ratio (SNR), radar generally exhibits a higher estimation performance on the object's distance, angle, and speed. Of objects having the same radar cross section (RCS), the one that is closer to the ego vehicle has the higher SNR. Accordingly, against a near target having the same RCS, the radar provides the position and the velocity of the target object with high estimation accuracy. Meanwhile, the radar may calculate and generate the position of the object based on its distance and angle information in addition to the SNR. However, even though the object is positioned at the same angle with respect to the radar, the object incurs a very large positioning error as its distance increases with respect to the radar. Hence, the road facility tracking apparatus 200 performs initialization on a guardrail close to the ego vehicle by using short-distance detection.

The coordinate update unit 204 updates the tracking coordinates of the road facility in response to the vehicle coordinates that change with time, based on the motion characteristics of the vehicle. For example, the coordinate update unit 204 uses a vehicle coordinate before a preset detection time interval and tracking coordinates of the road facility before the preset detection time interval as bases for calculating changed vehicle coordinates with a reference of the vehicle coordinate before the preset detection time interval. The coordinate update unit 204 updates the tracking coordinates by using a direction cosine matrix and difference values between the changed vehicle coordinates and the tracking coordinates of the road facility before the preset detection time interval.

The coordinate update unit 204 utilizes a radio signal to determine the tracking coordinates of the guardrail based on a plurality of detection information items collected. The coordinate update unit 204 determines that the road facility exists when the transverse distance of the detection information corresponding to an object closest in the broadside direction from the reference of vehicle coordinates is smaller than a preset maximum distance $d_r$. When the transverse distance of detection information corresponding to the closest object is greater than a preset minimum distance $d_{min}$, the coordinate update unit 204 sets a detection area for tracking road facilities. Meanwhile, upon determining that no road facility exists, the coordinate update unit 204 determines whether detection information existing in the broadside direction is stationary detection information. The coordinate update unit 204 sets a detection area when it is determined that there is stationary detection information in the broadside direction. The coordinate update unit 204 counts and outputs the number of total detection information items and the number of stationary detection information items existing in the detection area. When the number of the stationary detection information items is greater than a preset standard number and the ratio of the number of the stationary detection information items to the number of the total detection information items is greater than a preset standard ratio, the coordinate update unit 204 determines the tracking coordinates based on linear regression. When determining the tracking coordinates based on the linear regression, the coordinate update unit 204 determines a longitudinal coordinate of a radar included in the vehicle as a longitudinal coordinate of the road facility. The coordinate update unit 204 determines an average of the transverse coordinates in the stationary detection information items existing in the detection area as a transverse coordinate of the road facility.

The ghost remover unit 206 deletes a ghost target existing beyond the road facility, based on the updated tracking coordinates. The ghost remover unit 206 generates a linearized road facility section based on a plurality of detection information items to determine a ghost target. The ghost remover unit 206 extracts boundary coordinates corresponding to longitudinal coordinates in the new detection information on the linearized road facility section. The ghost remover unit 206 compares transverse coordinates in the new detection information with transverse coordinates in the boundary coordinates. For example, to track the left guardrail with respect to the driving direction of the vehicle 100, the ghost remover unit 206 sees if the transverse coordinates in the new detection information are greater than the transverse coordinates in the boundary coordinates and if yes, it determines the new detection information as a ghost target. Here, the transverse coordinates on the coordinate axes are assumed to be positive in magnitude on the left side with respect to the driving direction of the vehicle 100.

The detection information classification unit 208 classifies the detection information determined to exist beyond the road facility as interested detection information or a ghost target. The ghost remover unit 206 excludes, from measurement update information, the detection information classified as a ghost target by the detection information classification unit 208.

Figure 3A:
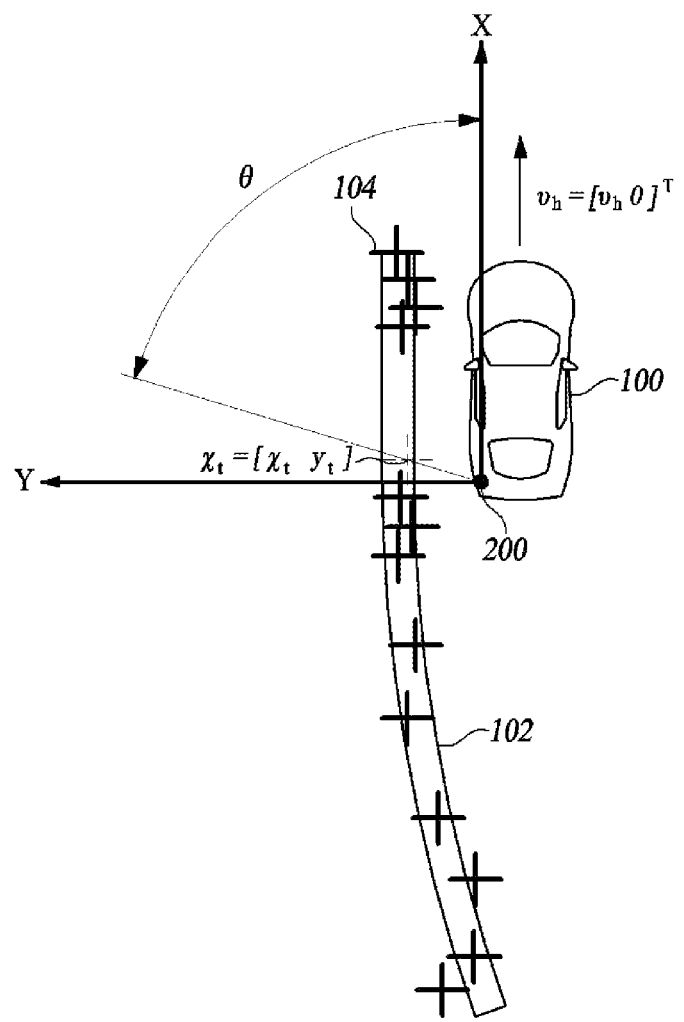
FIGS. 3A and 3B are diagrams of the road facility tracking apparatus tracking one or more guardrails according to at least one embodiment of the present disclosure.
Figure 3B:
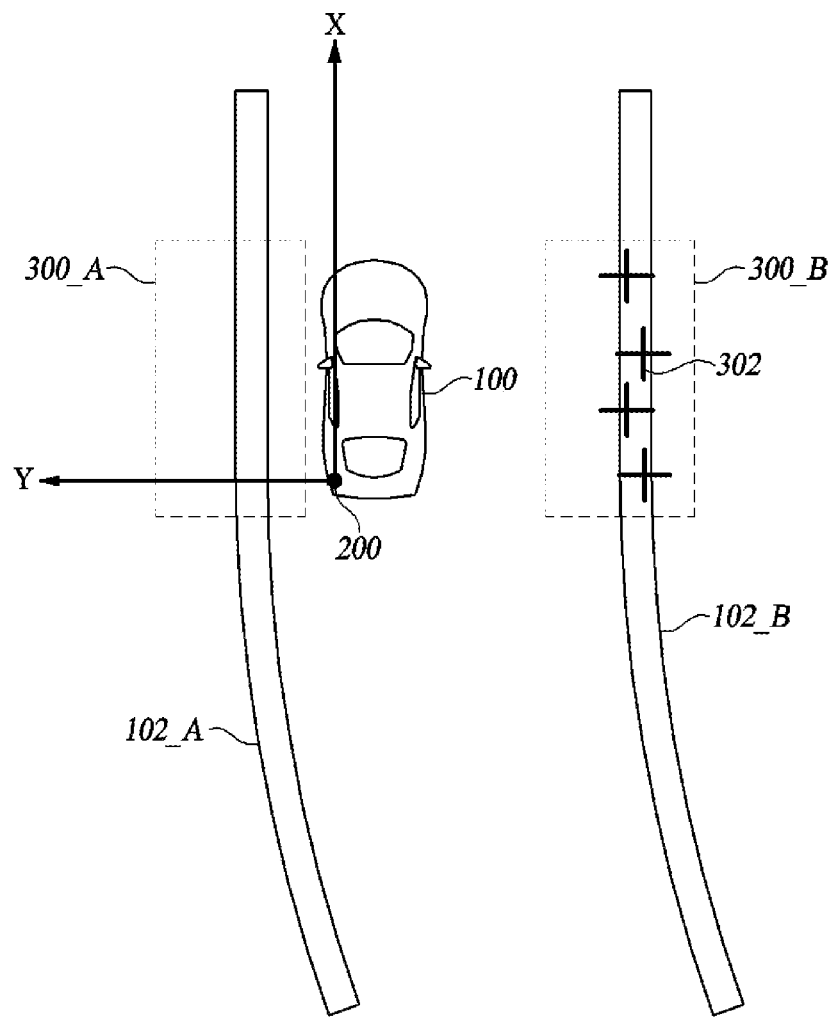

FIGS. 3A and 3B are diagrams of the road facility tracking apparatus 200 tracking one or more guardrails according to at least one embodiment of the present disclosure.

As shown in FIG. 3A, the road facility tracking apparatus 200 included in the vehicle 100 tracks the position of the guardrail 102 based on the detection information 104. A Doppler velocity $v_d$ of the vehicle 100 with respect to the detection information on the guardrail 102, which are collected at time t is expressed by Equation 1. Here, $v_h$ means the speed of the vehicle. θ denotes an estimated angle between the vector of the moving direction of the vehicle and the direction vector of detection information $x_t$ for the vehicle.

$$v_d \triangleq x_t^T \cdot \frac{v_h}{\|x_t\|} = \|v_h\|\cos\theta \qquad \text{Equation 1}$$

Since the guardrail is a continuous structure installed on the road, it can be considered as a stationary target. The Doppler speed of the stationary target is determined by the estimated angle of the stationary target. Accordingly, when Doppler information on the object at the estimated position is within a preset threshold range, the detected object may be determined to be a stationary target. Here, the threshold range is determined by the capacity of the radar sensor. In at least one embodiment, a vehicle coordinate plane may be set to have the x-axis as the driving direction of the vehicle and the y-axis as the direction toward the left guardrail and perpendicular to the driving direction of the vehicle. Since the vehicle generally travels in a direction almost parallel to the guardrail, when the radar performs detection using the guardrail, it may obtain detection information items having similar component values in the y-axis direction. When the radar performs detection with the guardrail, the guardrail may be wrongly determined to be a moving target due to an error in angle information generated by the Doppler effect. To eliminate such a misjudgment, the road facility tracking apparatus 200 tracks the guardrail 102 based on the number of stationary detection information items.

As shown in FIG. 3B, the road facility tracking apparatus 200 tracks a guardrail 102 by using stationary detection information items 302 included in a detection area 300. When the road facility tracking apparatus 200 tracks the guardrail 102, detection information in the broadside direction has the highest reliability and is frequently detected among other detection information in various directions. Accordingly, the road facility tracking apparatus 200 tracks the guardrail 102 with the reference of detection information items 302 in the broadside direction. The road facility tracking apparatus 200 checks whether there are more stationary detection information items 302 in the detection area 300 along the broadside direction than a preset reference number, and the ratio of the number of the stationary detection information items 302 to the number of total detection information items is greater than a preset reference ratio, and if yes, it determines the tracking coordinates based on linear regression. Meanwhile, the coordinates of the i-th stationary detection information $X_{obj.ST}^i$ among the plurality of stationary detection information items 302 collected in the preset detection area 300 may be expressed as in Equation 2 below.

$$X_{obj.ST}^i = [x_{ST}^i \ y_{ST}^i]^T \qquad \text{Equation 2}$$

When determining the tracking coordinates based on the linear regression, the road facility tracking apparatus 200 may determine the longitudinal coordinate $X_{FR}$ of the radar included in the vehicle 100 as the longitudinal coordinate of the guardrail 102. The road facility tracking apparatus 200 may determine the average of the transverse coordinates $Y_{ST}^i$ of the plurality of stationary detection information items 302 existing in the detection area 300 as the transverse coordinate of the guardrail 102. The longitudinal coordinate $x_{GR}^{ini}$ and transverse coordinate $y_{GR}^{ini}$ of the guardrail 102 may be expressed as in Equation 3. The tracking point interval for the guardrail 102 is set in consideration of the computability and memory of the road facility tracking apparatus 200. The tracking point interval may be expressed as $d_{GR}$.

$$x_{GR}^{ini} = x_{FR} \qquad \text{Equation 3A}$$

$$y_{GR}^{ini} = \frac{1}{N}\sum_{i=0}^{N-1} y_{ST}^{i} \qquad \text{Equation 3B}$$

Figure 4A:
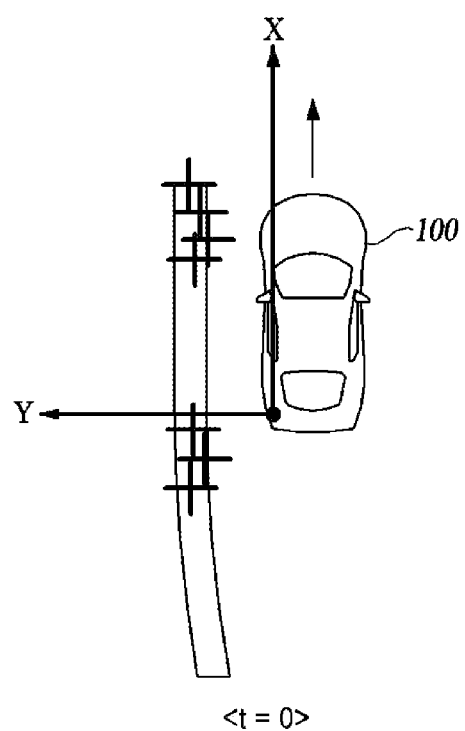
FIGS. 4A, 4B, and 4C are diagrams of the road facility tracking apparatus according to at least one embodiment updates changing coordinates of a guardrail, which change with time.
Figure 4B:
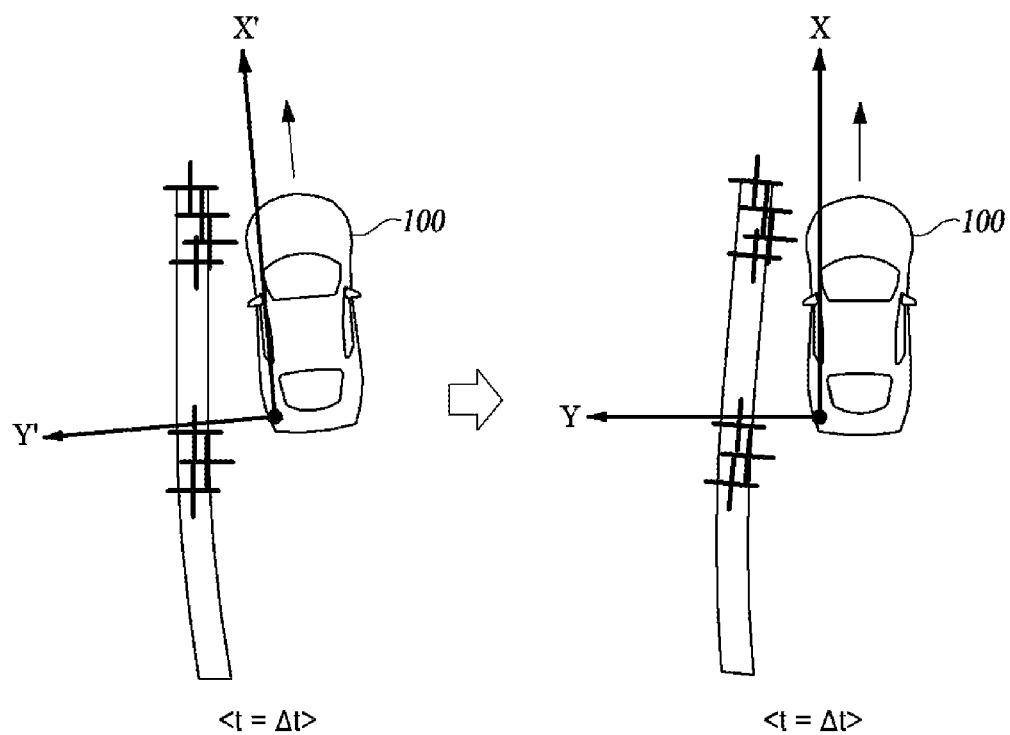
Figure 4C:
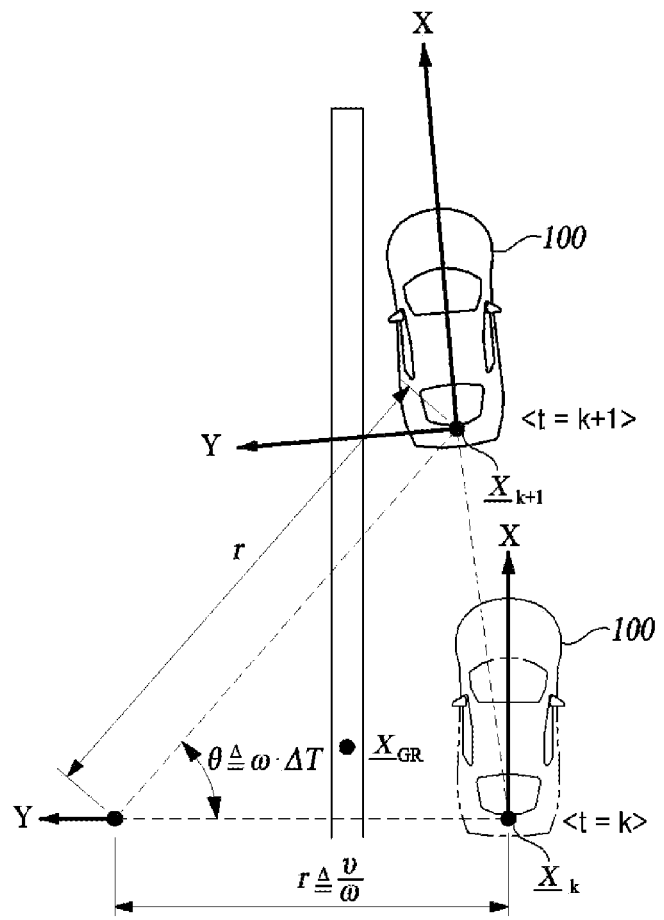

FIGS. 4A, 4B, and 4C are diagrams of the road facility tracking apparatus 200 according to at least one embodiment updates changing coordinates of a guardrail, which change with time.

The following describes an embodiment in which the road facility tracking apparatus 200 updates the position of the guardrail by using a motion model of the ego vehicle.

In FIG. 4A, when time t is 0, that is, at present, the vehicle 100 is traveling in a direction parallel to the guardrail 102. In FIG. 4B, when the update period is defined as Δt, the position of the ego vehicle is illustrated as changed after Δt. The amount of position change may be calculated by using a relational expression between the speed and the yaw rate of the ego vehicle. However, since the origin of the vehicle coordinate plane is the current location of the vehicle 100, the road facility tracking apparatus 200 needs to update the location information of the guardrail 102 as the vehicle 100 moves. For example, the road facility tracking apparatus 200 updates the location information of the guardrail included in the previously collected detection information 104, based on the current location and movement direction of the vehicle 100, which have changed over time. Meanwhile, a target that is farther than a preset detection distance from the vehicle 100 may incur a large error in the detection information. When updating the position information of the guardrail, the road facility tracking apparatus 200 determines that the absolute position of the target estimated at a short distance has not changed. The road facility tracking apparatus 200 updates only the relative position of the target with respect to the position of the vehicle 100 changed by movement.

FIG. 4C illustrates a change in the position of the ego vehicle before and after a time interval. Since the vehicle 100 is moving while the guardrail 102 is stationary, the coordinates of the guardrail 102 with respect to the position of the vehicle 100 change in real-time. Therefore, it is necessary to conform the relative position of the guardrail 102 to the motion characteristics of the vehicle 100. Here, it is assumed that the speed change of the vehicle 100 is 0 at time k and at k+1. The angular velocity of the vehicle 100 may be expressed as Equations 4A and 4B. Here, T denotes a time interval for collecting position information of the ego vehicle. The radius of curvature for the vehicle 100 may be expressed as in Equation 4C. When the vehicle 100 is in the k-th state, the linear velocity vector and the angular velocity vector of the vehicle 100 may be expressed as Equations 4D and 4E.

$$w_h = \frac{d\theta}{dt} \cong \frac{\theta}{\Delta T} \qquad \text{Equation 4A}$$

$$\theta \triangleq w_h \cdot \Delta T \qquad \text{Equation 4B}$$

$$r \triangleq \frac{v_x}{w_h} \qquad \text{Equation 4C}$$

$$\underline{v}_h = [v_x \ 0]^T \qquad \text{Equation 4D}$$

$$\underline{w}_h = [0 \ 0 \ w_h]^T \qquad \text{Equation 4E}$$

The position coordinates of the guardrail 102 in FIG. 4C may be expressed as in Equation 5A. The vehicle position at time k+1 relative to the vehicle position at time k is as shown in Equation 5B. The vehicle speed at time k+1 relative to the vehicle speed at time k is as shown in Equation 5C. The vehicle position and vehicle speed at time k+1 are as shown in Equations 5D and 5E. Here, the speed $v_x$ in the x-axis direction of the vehicle 100 may be changed.

$$\underline{X}_{GR} = [x_{GR} \ y_{GR}]^T \qquad \text{Equation 5A}$$

$$\underline{X}_{k+1}^{own}|_k = r[\sin\theta \ 1-\cos\theta]^T \qquad \text{Equation 5B}$$

$$\underline{v}_{k+1}^{own}|_k = v_x * [\cos\theta \ \sin\theta]^T \qquad \text{Equation 5C}$$

$$\underline{X}_{k+1}^{own}|_{k+1} = [0 \ 0]^T \qquad \text{Equation 5D}$$

$$\underline{v}_{k+1}^{own}|_{k+1} = [v_x \ 0]^T \qquad \text{Equation 5E}$$

The coordinates of the position of the guardrail 102 at time k+1 may be calculated according to Equation 6A. Here, the direction cosine matrix R(θ) is as shown in Equation 6B.

$$\underline{X}_{GR}|_{k+1} = \underline{R}(\theta)[\underline{X}_{GR}|_k - \underline{X}_{k+1}^{own}|_k]^T \qquad \text{Equation 6A}$$

$$\underline{R}(\theta) = \begin{bmatrix} \cos\theta & \sin\theta \\ -\sin\theta & \cos\theta \end{bmatrix} \qquad \text{Equation 6B}$$

Figure 5A:
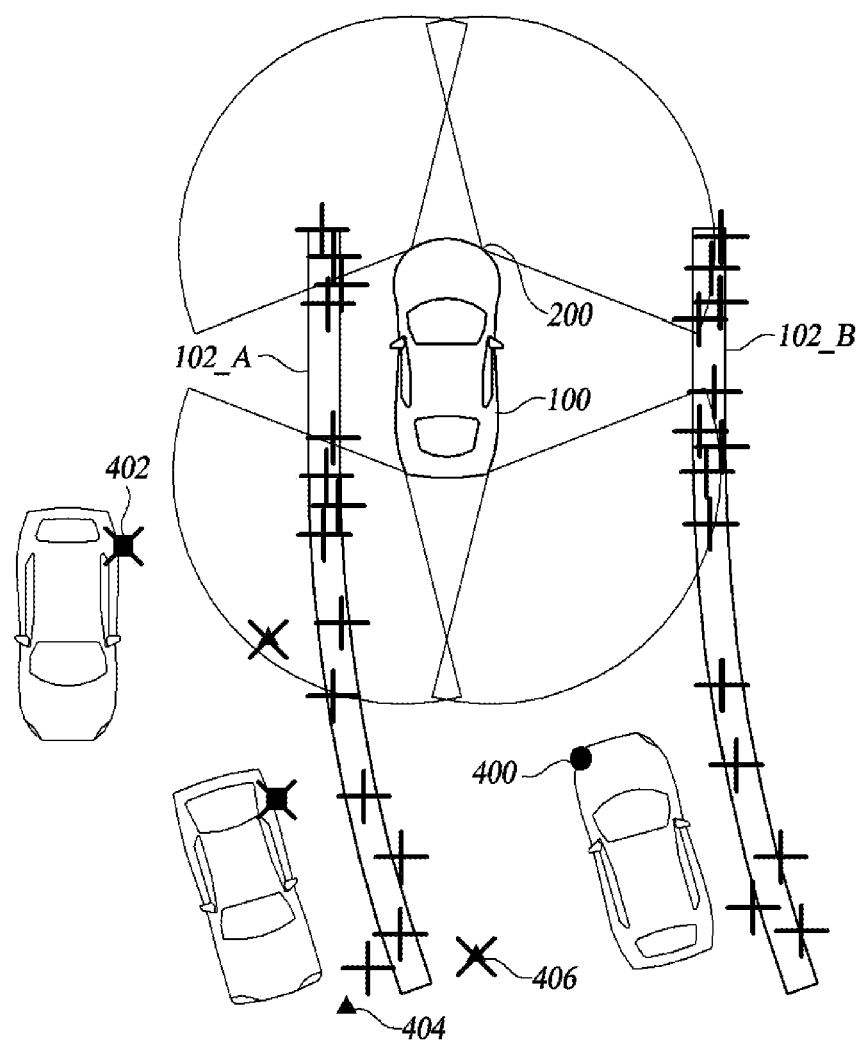
FIGS. 5A and 5B are diagrams of the road facility tracking apparatus deleting ghost tracking, according to at least one embodiment of the present disclosure.
Figure 5B:
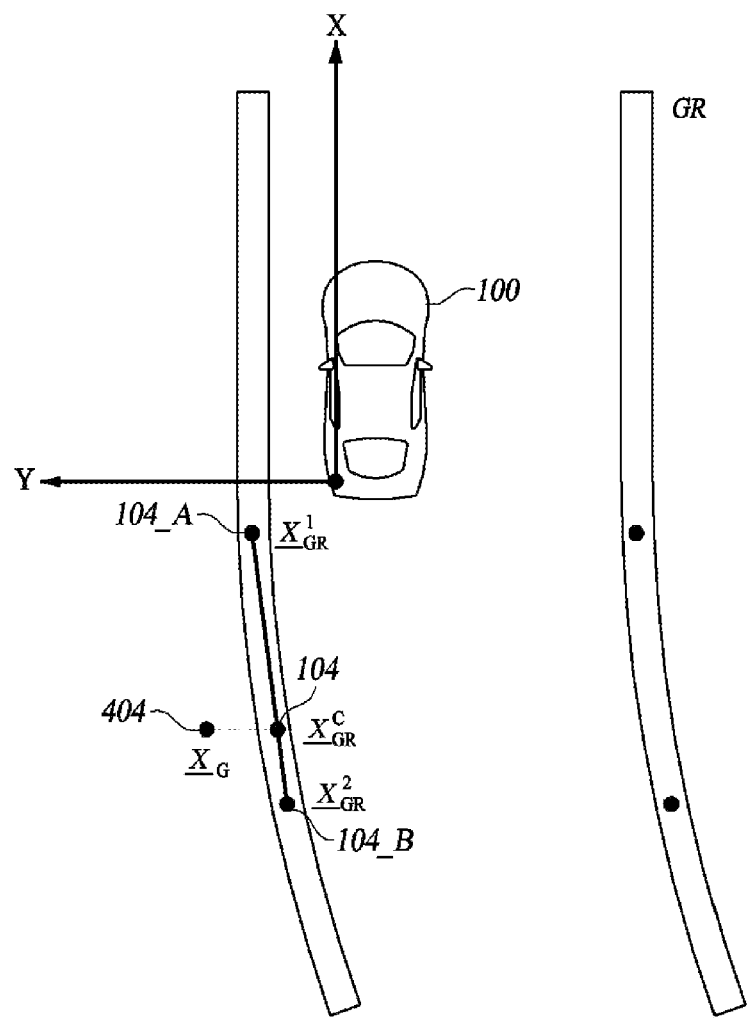

FIGS. 5A and 5B are diagrams of the road facility tracking apparatus 200 deleting ghost tracking, according to at least one embodiment of the present disclosure.

In FIG. 5A, a vehicle 402 and a ghost target 404 in the opposite lane are shown, which cause radar performance degradation. When detecting a target with a radar system, a clutter or deterioration in detection performance would incur the ghost target 404 in a short distance or a long distance. The clutter refers to a radars received signal after being reflected by an object that is not a target of interest. In the present disclosure, the ghost target 404 includes one that exists beyond the guardrail 102, such as the vehicle 402 traveling in the opposite lane. The opposite-lane vehicle 402 is the target causing unnecessary tracking of the radar system with the highest frequency. The ghost target 404 is susceptible to causing a false alarm of the BCW or RCCW (blind-spot collision warning or rear cross-traffic collision warning) software application and the like. The ghost target 404 also causes unnecessary tracking of the software application, thereby increasing computational complexity substantially. Therefore, the road facility tracking apparatus 200 excludes the ghost target 404, which is not the target of interest, from the measurement update information when the vehicle 100 is driving, thereby solving the undesirable increase of the computational complexity of the software application. The process of excluding detection information classified as the ghost target 404 when the road facility tracking apparatus 200 updates the measurement value may be referred to as the removal of the ghost tracking. An interested detection information 400 is illustrated to represent a target existing in the traveling direction of the vehicle 100 or a target approaching the vehicle 100. The road facility tracking apparatus 200 prevents a malfunction of the software application by removing the ghost tracking 406, thereby securing the driving safety of the ego vehicle.

FIG. 5B shows stationary detection information items 104_A and 104_B for linearization. For example, the interval between stationary detection information items $\underline{X}_{GR}^1$ and $\underline{X}_{GR}^2$ may be set to several meters, and the curvature of the interval may be ignored. The road facility tracking apparatus 200 generates a road facility section passing through $\underline{X}_{GR}^1$ and $X_{GR}^2$. The equation of the straight line for the road facility section is as shown in Equation 7A. The road facility tracking apparatus 200 extracts boundary coordinates 404 corresponding to the longitudinal coordinates of new detection information 104. The boundary coordinates 404 and the transverse coordinates in the boundary coordinates are as shown in Equations 7B and 7C.

$$y - y_1 = \frac{y_2 - y_1}{x_2 - x_1}(x - x_1) \quad \text{Equation 7A}$$

$$\underline{X}_{GR}^C = \left[ x_{GR}^C(y_1 + \frac{y_2 - y_1}{x_2 - x_1}(x_G - x_1)) \right]^T \quad \text{Equation 7B}$$

$$y_1 + \frac{y_2 - y_1}{x_2 - x_1}(x_G - x_1) \triangleq y_{GR}^C \quad \text{Equation 7C}$$

The road facility tracking apparatus 200 performs filtering and target prediction of the detection information after a data association process for the new detection information 104. For example, when tracking the left guardrail, the road facility tracking apparatus 200 checks if transverse coordinate $y_G$ in the new detection information 104 is greater than transverse coordinate $y_{GR}^C$ in the boundary coordinates 404, and if yes, it determines that the new detection information 104 is a ghost target. Like when determining the ghost target for the left guardrail, the road facility tracking apparatus 200 checks if the transverse coordinate in the new detection information has a smaller value than the transverse coordinate in the boundary coordinates and if yes, it may determine the new detection information as a ghost target. The road facility tracking apparatus 200 filters the new detection information 104 classified as a ghost target. For example, the road facility tracking apparatus 200 may improve the tracking accuracy for the target of interest by excluding the new detection information 104 from the measurement update information.

Figure 6A:
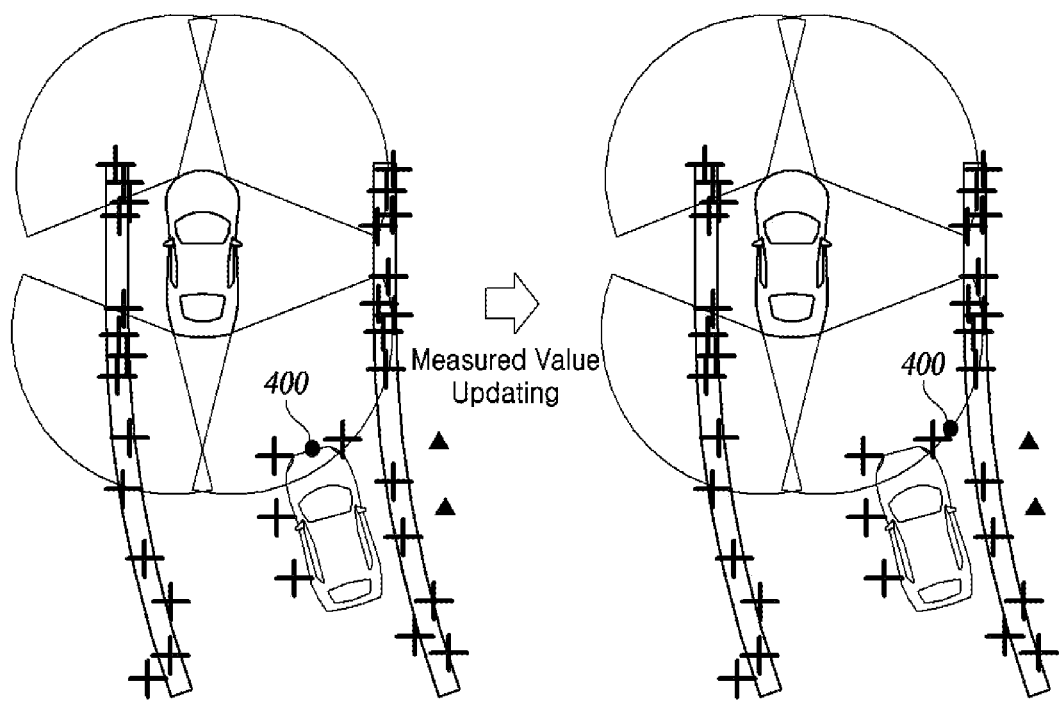
Figure 6B:
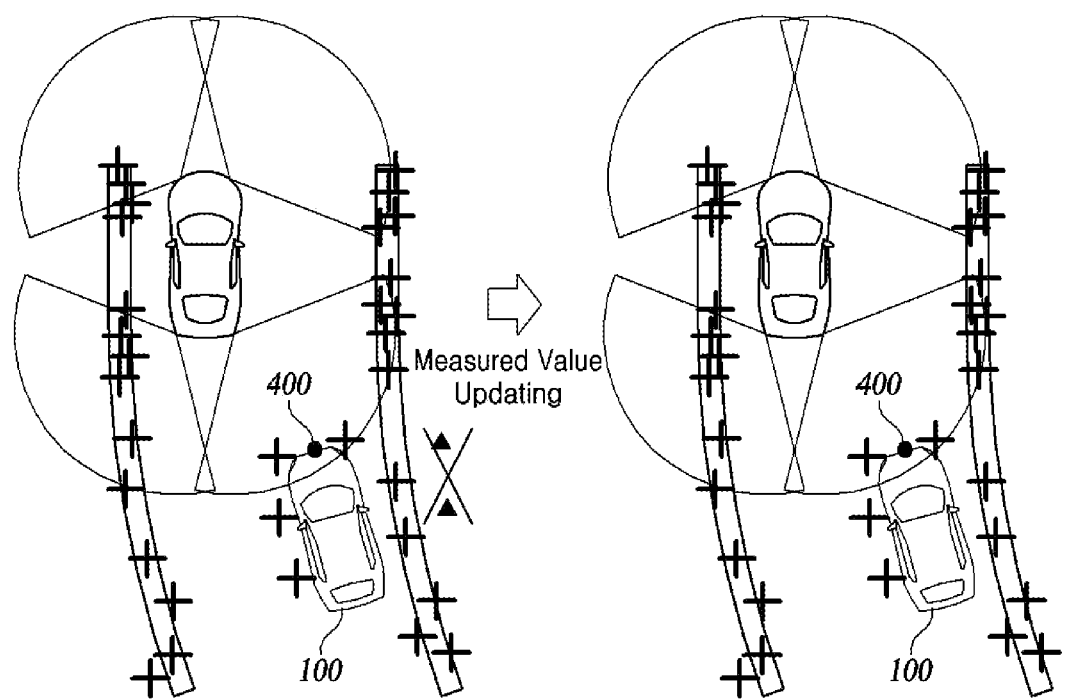
FIG. 6B illustrates how the road facility tracking apparatus improves the accuracy of tracking the target vehicle, according to at least one embodiment.

FIG. 6A illustrates a prior art method of tracking a target vehicle, whereas FIG. 6B illustrates how the road facility tracking apparatus improves the accuracy of tracking the target vehicle, according to at least one embodiment.

FIG. 6A illustrates a case where an error occurs in interested detection information because ghost targets persist. A radar system emits radio waves in an outdoor road environment and tracks a target vehicle based on a signal reflected from the target vehicle. However, when the radar detects a target vehicle in a tunnel, the detection performance may be deteriorated due to multipath interference. For example, radio waves radiated from the radar may be scattered by the walls inside the tunnel in addition to the target vehicle. The radar receives scattered multipath signals and detects the target vehicle based on the received signals. This substantially increases both the positioning error of the target vehicle and the frequency of malfunction of the software application in comparison with the radar performance in the outdoor road environment. A malfunction of the software application may be a situation where an alarm becomes silent even when the target vehicle approaches the ego vehicle. That malfunction of the software application may even highly endanger the vehicle occupants' safety through the unalarmed risk of collision with the target.

Whereas, FIG. 6B shows the road facility tracking apparatus 200 using the guardrail tracking technique according to at least one embodiment of the present disclosure to solve the problem of degradation of detection performance due to multipath interference. For example, when tracking the target vehicle, the road facility tracking apparatus 200 excludes, from the measurement update information, detection information existing beyond the guardrail. Since the road facility tracking apparatus 200 excludes the detection information that exists beyond the guardrail, it can solve the problematic inaccurate tracking point moving when updating the detection information.

Figure 7:
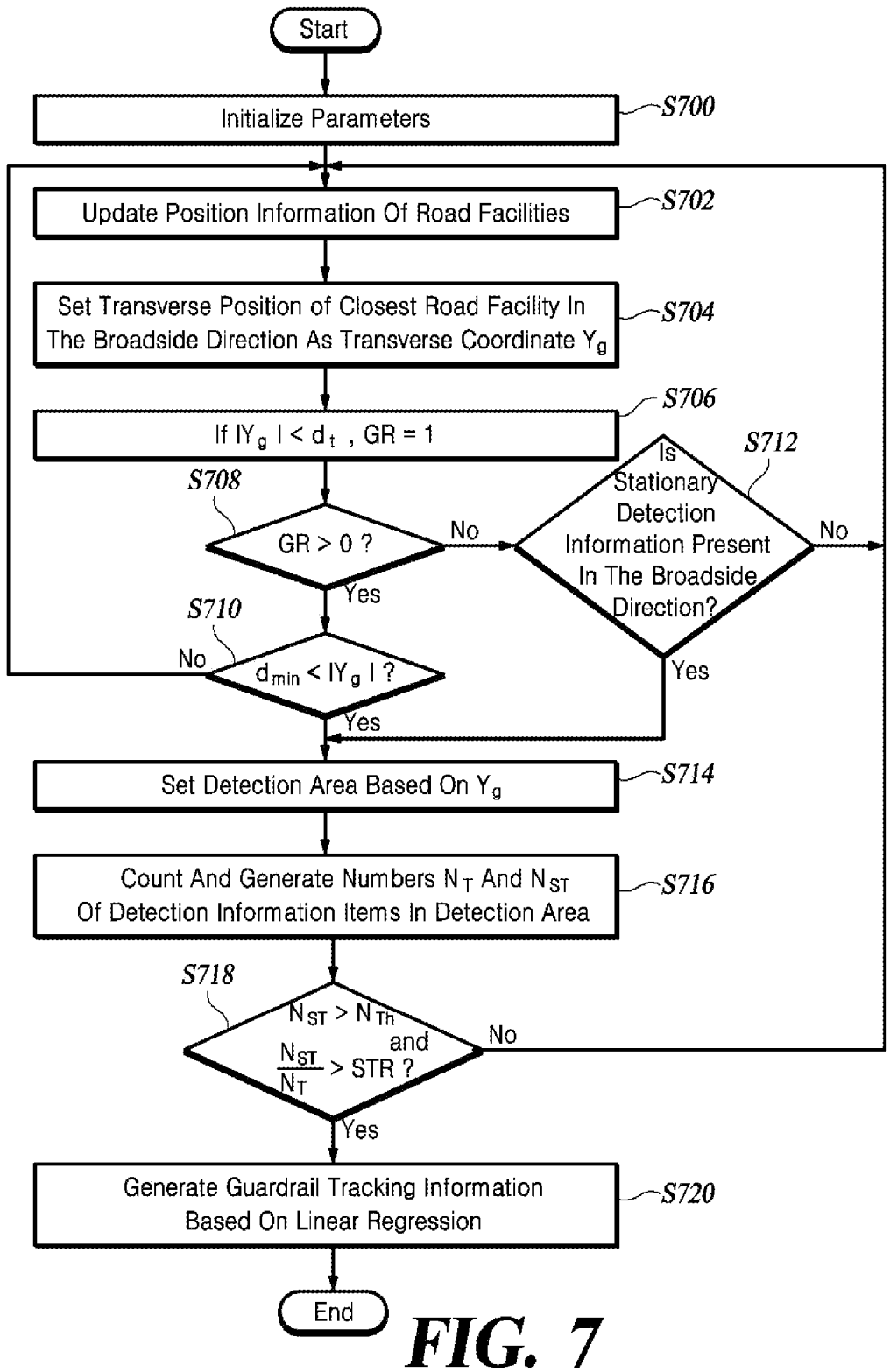
FIG. 7 is a flowchart for explaining a road facility tracking method step by step according to at least one embodiment of the present disclosure.

FIG. 7 is a flowchart for explaining a road facility tracking method step by step according to at least one embodiment of the present disclosure.

The following describes the respective steps of the road facility tracking method performed by the road facility tracking apparatus 200 by referring to FIG. 7. A description repetitive of those of FIGS. 1 to 6 will be omitted.

The coordinate generation unit 202 initializes parameters (S700). For example, the coordinate generation unit 202 generates initial coordinates for updating the tracking coordinates of road facilities based on the location of the vehicle and a plurality of detection information items 104 collected by the radar included in the vehicle.

The coordinate update unit 204 updates the position information of road facilities (S702). In some embodiments, Step S702 is an operation performed after Steps S704 to S712.

The coordinate generating unit 202 sets the transverse position of the road facility existing closest to the vehicle in the broadside direction as transverse coordinate $Y_g$ in the detection information for tracking the guardrail 102 (S704).

The coordinate update unit 204 checks if the transverse distance of the detection information corresponding to an object closest in the broadside direction is smaller than a preset maximum distance $d_t$ and if yes, it determines that the road facility exists and declares the GR value as 1 (S706). Here, GR means a variable for determining whether the guardrail 102 is present. The coordinate update unit 204 declares a GR value of 0 when it determines that no guardrail is present.

The coordinate update unit 204 determines whether the GR value has a value greater than 0 (S708), and if yes, it compares the absolute value of transverse coordinate $Y_g$ with the value of preset minimum distance $d_{min}$ (S710). When the absolute value of transverse coordinate $Y_g$ is equal to or less than minimum distance $d_{min}$, the coordinate update unit 204 repeats Steps S702 to S712.

The coordinate update unit 204 checks if the GR value is less than or equal to 0 (S708), and if yes, it determines whether stationary detection information 104 is present in the broadside direction (S712). When no stationary detection information is present in the broadside direction, the coordinate update unit 204 repeats Steps S702 to S712.

When the absolute value of transverse coordinate value $Y_g$ is greater than minimum distance $d_{min}$ or the stationary detection information 104 exists in the broadside direction, the coordinate update unit 204 sets the detection area 300 based on transverse coordinate value $Y_g$ (S714).

The coordinate update unit 204 counts and generates the number NT of total detection information items and the number $N_{ST}$ of the stationary detection information items existing in the detection area 300 (S716).

The coordinate update unit 204 determines whether the number $N_{ST}$ of the stationary detection information items is greater than the preset reference number $N_{Th}$, and whether the ratio of the number $N_{ST}$ of the stationary detection information items to the number NT of total detection information items has a value greater than the preset reference ratio (S718). The coordinate update unit repeats Steps S702 to S718 when the number $N_{ST}$ of the stationary detection information items is less than or equal to the reference number $N_{Th}$ or the ratio of the number $N_{ST}$ of the stationary detection information items to the number NT of total detection information items is less than or equal to the reference ratio.

The coordinate update unit 204 determines the tracking coordinates based on linear regression when the condition of Step S718 is satisfied (S720).

Although the present disclosure presents the flowchart with the steps thereof illustrated as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of the steps described by the flowchart or by performing one or more of the steps in the flowchart in parallel, and hence the steps in the flowchart are not limited to the illustrated chronological sequences.

Various implementations of the apparatus and method described herein may be realized by digital electronic circuitry, integrated circuits, field-programmable gate arrays (FPGAs), application-specific integrated circuits (ASICs), computer hardware, firmware, software, and/or their combinations. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or codes) contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. Further, the computer-readable recording medium can be distributed in computer systems connected via a network, wherein the computer-readable codes can be stored and executed in a distributed mode.

Various implementations of the apparatus and method described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

According to at least one embodiment, the present disclosure provides a method for tracking a road facility and an apparatus therefor which can remove short-distance ghost tracking due to ambiguity of speed information about a surrounding object.

According to at least one embodiment, the present disclosure provides a method for tracking a road facility and an apparatus therefor which can remove long-distance ghost tracking due to deterioration of the detection performance of the radar.

According to at least one embodiment, the present disclosure provides a method for tracking road facilities and an apparatus for the same which can reduce the computational workload by excluding, from measurement update information, detection information of a vehicle in the opposite direction running past the ego vehicle.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. An apparatus for tracking a road facility, comprising a processor configured to:

generate initial coordinates based on a location of a vehicle and a plurality of detection information items collected by a radar included in the vehicle, the initial coordinates being generated for updating tracking coordinates of the road facility, update, based on motion characteristics of the vehicle, the tracking coordinates of the road facility in response to vehicle coordinates that change over time, generate a linearized road facility section based on two detection information items among the plurality of detection information items, extract boundary coordinates corresponding to longitudinal coordinates in new detection information over the linearized road facility section, compare transverse coordinates included in the new detection information with transverse coordinates included in the boundary coordinates, determine that the new detection information is a ghost target existing beyond the road facility located leftward or rightward of the vehicle in response to determining that the transverse coordinates in the new detection information are greater than the transverse coordinates in the boundary coordinates, and exclude the ghost target existing beyond the road facility from measurement update information, wherein the processor controls an Advanced Driver Assistance System (ADAS) of the vehicle by using information of the updated tracking coordinates of the road facility that has excluded the ghost target.

2. The apparatus of claim 1, wherein the processor is further configured to generate, as the initial coordinates, detection information corresponding to an object closest from the radar in a broadside direction which is perpendicular to a driving direction of the vehicle.

3. The apparatus of claim 1, wherein the processor is further configured to:
use a vehicle coordinate before a preset detection time interval and the tracking coordinates of the road facility before the preset detection time interval as bases for calculating the vehicle coordinates changed with a reference of the vehicle coordinate before the preset detection time interval, and
update the tracking coordinates by using a direction cosine matrix and difference values between the changed vehicle coordinates and the tracking coordinates of the road facility before the preset detection time interval.

4. The apparatus of claim 2, wherein the processor is further configured to:
determine that the road facility is present in response to determining that a transverse distance of the detection information is smaller than a preset maximum distance, the detection information corresponding to an object being closest in the broadside direction with a reference of the vehicle coordinates,
set a detection area for tracking the road facility in response to determining that the transverse distance of the detection information that is closest is greater than a preset minimum distance,
count and output a number of total detection information items existing in the detection area and a number of stationary detection information items in the detection area, and
determine the tracking coordinates based on linear regression in response to determining that the number of the stationary detection information items is greater than a preset reference number and a ratio of the number of the stationary detection information items to the number of the total detection information items is greater than a preset reference ratio.

5. The apparatus of claim 4, wherein the processor is further configured to:
in response to determining that no road facility is present, determine whether the detection information existing in the broadside direction is stationary detection information, and
set the detection area in response to determining that the stationary detection information is present in the broadside direction.

6. The apparatus of claim 4, wherein the processor is further configured to:
determine a longitudinal coordinate of the radar included in the vehicle as a longitudinal coordinate of the road facility, and
determine an average of transverse coordinates in the stationary detection information items existing in the detection area as a transverse coordinate of the road facility.

7. A method for tracking a road facility, comprising:
generating initial coordinates based on a location of a vehicle and a plurality of detection information items collected by a radar included in the vehicle, the initial coordinates being generated for updating tracking coordinates of the road facility;
updating, based on motion characteristics of the vehicle, the tracking coordinates of the road facility in response to vehicle coordinates that change over time;
generating a linearized road facility section based on two detection information items among the plurality of detection information items;
extracting boundary coordinates corresponding to longitudinal coordinates in new detection information over the linearized road facility section;
comparing transverse coordinates included in the new detection information with transverse coordinates included in the boundary coordinates;
determining that the new detection information is a ghost target for the road facility located leftward or rightward of the vehicle in response to determining that the transverse coordinates in the new detection information are greater than the transverse coordinates in the boundary coordinates;
excluding the ghost target existing beyond the road facility from measurement update information, based on the tracking coordinates having been updated; and
controlling an Advanced Driver Assistance System (ADAS) of the vehicle by using information of the updated tracking coordinates of the road facility that has excluded the ghost target.

8. The method of claim 7, wherein the generating of the initial coordinates comprises:
generating, as the initial coordinates, detection information corresponding to an object closest from the radar in a broadside direction which is perpendicular to a driving direction of the vehicle.

9. The method of claim 7, wherein the updating of the tracking coordinates comprises:
based on a vehicle coordinate before a preset detection time interval and the tracking coordinates of the road facility before the preset detection time interval, calculating the vehicle coordinates changed with a reference of the vehicle coordinate before the preset detection time interval; and
updating the tracking coordinates by using a direction cosine matrix and difference values between the changed vehicle coordinates and the tracking coordinates of the road facility before the preset detection time interval.

10. The method of claim 8, wherein the updating of the tracking coordinates further comprises:
determining that the road facility is present in response to determining that a transverse distance of the detection information is smaller than a preset maximum distance, the detection information being closest in the broadside direction with a reference of the vehicle coordinates;
setting a detection area for tracking the road facility in response to determining that the transverse distance of the detection information that is closest is greater than a preset minimum distance;
computing a number of total detection information items existing in the detection area and a number of stationary detection information items in the detection area; and
determining the tracking coordinates based on linear regression in response to determining that the number of the stationary detection information items is greater than a preset reference number and a ratio of the number of the stationary detection information items to the number of the total detection information items is greater than a preset reference ratio.

11. The method of claim 10, wherein the updating of the tracking coordinates further comprises:

in response to determining that no road facility is present, determining whether the detection information existing in the broadside direction is stationary detection information; and setting the detection area in response to determining that the stationary detection information is present in the broadside direction.

12. The method of claim 10, wherein the determining of the tracking coordinates based on linear regression comprises:

determining a longitudinal coordinate of the radar included in the vehicle as a longitudinal coordinate of the road facility; and determining an average of transverse coordinates in the stationary detection information items existing in the detection area as a transverse coordinate of the road facility.

13. The method of claim 7, further comprising:
classifying detection information determined to exist beyond the road facility as interested detection information or the ghost target.

14. A vehicle comprising the apparatus for tracking a road facility of claim 1.

* * * * *